United States Patent
Ge et al.

(10) Patent No.: US 11,474,637 B2
(45) Date of Patent: Oct. 18, 2022

(54) DISPLAY SCREEN AND DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventors: Tengfei Ge, Wuhan (CN); Qibing Dai, Wuhan (CN)

( * ) Notice: Subject to any disclaimer, the term of this patent is extended or adjusted under 35 U.S.C. 154(b) by 110 days.

(21) Appl. No.: 17/053,780

(22) PCT Filed: Jun. 28, 2020

(86) PCT No.: PCT/CN2020/098620
§ 371 (c)(1),
(2) Date: Nov. 8, 2020

(87) PCT Pub. No.: WO2021/248574
PCT Pub. Date: Dec. 16, 2021

(65) Prior Publication Data
US 2022/0187973 A1      Jun. 16, 2022

(30) Foreign Application Priority Data
Jun. 10, 2020   (CN) .......................... 202010522315.8

(51) Int. Cl.
G06F 3/041    (2006.01)
G06F 3/044    (2006.01)
G06V 40/13    (2022.01)

(52) U.S. Cl.
CPC ........ *G06F 3/04166* (2019.05); *G06F 3/0446* (2019.05); *G06V 40/1306* (2022.01)

(58) Field of Classification Search
None
See application file for complete search history.

(56) References Cited

U.S. PATENT DOCUMENTS

| 2016/0364593 | A1  | 12/2016 | Lee et al. |
| 2017/0344789 | A1* | 11/2017 | Chang ..................... G06F 3/041 |
| 2018/0005004 | A1  | 1/2018  | Du et al. |
| 2018/0089485 | A1* | 3/2018  | Bok ...................... G06F 1/1684 |

FOREIGN PATENT DOCUMENTS

| CN | 205665715 U | 10/2016 |
| CN | 106293287 A | 1/2017 |
| CN | 107437045 A | 12/2017 |
| CN | 109977911 A | 7/2019 |
| CN | 110989323 A | 4/2020 |
| EP | 2368170 B1  | 11/2017 |

* cited by examiner

*Primary Examiner* — Nicholas J Lee

(57) ABSTRACT

The present disclosure provides a display screen and a display device, including a display panel, a touch control layer, a first driving chip, and a second driving chip. The touch control layer includes a first recognition device configured to generate fingerprint data and a second recognition device configured to generate touch control data. The first driving chip is configured to make a fingerprint identification of a first recognition area according to the fingerprint data, and the second driving chip is configured to make a touch control recognition of the first recognition area and a second recognition area according to the fingerprint data and the touch control data.

16 Claims, 7 Drawing Sheets

DISPLAY SCREEN AND DISPLAY DEVICE

BACKGROUND

Field of Invention

The present disclosure relates to a field of display technology, and more particularly, to a display screen and a display device.

Description of Prior Art

With development of mobile terminals, mobile terminals with both fingerprint identification and touch control recognition are becoming more and more popular.

A fingerprint identification module and a touch control recognition module of existing mobile terminals work separately, that is, the fingerprint identification module is only configured to make a fingerprint identification, and the touch control recognition module is only configured to make a touch control recognition, resulting in a decrease in resource utilization.

SUMMARY

A purpose of an embodiment of the present disclosure is to provide a display screen and a display device to increase a utilization of a first recognition device.

The present disclosure provides a display screen, including: a display panel, a touch control layer, a first driving chip, and a second driving chip;
wherein the touch control layer is disposed on the display panel, and includes a first recognition area and a second recognition area, and the touch control layer further includes:
  a first recognition device disposed on the first recognition area, and configured to generate fingerprint data corresponding to the first recognition area; and
  a second recognition device disposed on the second recognition area, and configured to generate touch control data corresponding to the second recognition area;
wherein the first driving chip is electrically connected to the first recognition device, and configured to receive and process the fingerprint data to make a fingerprint identification of the first recognition area, and the first driving chip is further electrically connected to the second driving chip and configured to send the fingerprint data to the second driving chip;
wherein the second driving chip is electrically connected to the second recognition device, and configured to receive and process both the touch control data and the fingerprint data to perform a touch recognition on both the first recognition area and the second recognition area.

In an embodiment, the first recognition device and the second recognition device are disposed on a same layer or a different layer.

In an embodiment, the touch control layer further includes a first conductive line layer and a first insulation layer when the first recognition device and the second recognition device are disposed on the same layer;
wherein the first insulation layer is disposed between the first conductive line layer and the first recognition device, and between the first conductive line layer and the second recognition device;
wherein the first insulation layer includes a first through-hole with a conductive material inside;
wherein the first conductive line layer includes:
  a first conductive line, wherein an end of the first conductive line is connected to the first recognition device by the first through-hole, and another end of the first conductive line is connected to the first driving chip; and
  a second conductive line, wherein an end of the second conductive line is connected to the second recognition device by the first through-hole, and another end of the second conductive line is connected to the second driving chip.

In an embodiment, the first recognition device and the second recognition device are disposed on the display panel, or the first conductive line layer is disposed on the display panel.

In an embodiment, the touch control layer further includes a second conductive line layer, a second insulation layer, and a third insulation layer when the first recognition device and the second recognition device are disposed on the different layer;
wherein the second recognition device is disposed on the display panel;
wherein the second insulation layer is disposed on the second recognition device, and includes a second through-hole with a conductive material inside;
wherein the second conductive line layer includes:
  a third conductive line, wherein an end of the third conductive line is connected to the second recognition device by the second through-hole, and another end of the third conductive line is connected to the second driving chip;
  a fourth conductive line, wherein an end of the fourth conductive line is connected to the first driving chip;
wherein the third insulation layer is disposed on the second conductive line layer, and includes a third through-hole with a conductive material inside;
wherein the second recognition device is disposed on the third insulation layer, and connected to another end of the fourth conductive line by the third through-hole.

In an embodiment, both the first recognition device and the second recognition device are mutual capacitance recognition devices or self-capacitance recognition devices.

In an embodiment, the first recognition device includes a plurality of first electrodes arranged in an array;
wherein the display screen further includes:
  a plurality of first scan lines, wherein each of the plurality of first scan lines is correspondingly connected to a first electrode of the plurality of first electrodes, or a row of the plurality of first electrodes; and
  a plurality of first induction lines, wherein each of the plurality of first induction lines is correspondingly connected to a first electrode of the plurality of first electrodes, or a column of the plurality of first electrodes.

In an embodiment, the second recognition device includes a plurality of second electrodes arranged in an array;
wherein the display screen further includes:
  a plurality of second scan lines, wherein each of the plurality of second scan lines is correspondingly connected to a second electrode of the plurality of second electrodes, or each of the plurality of second scan lines is correspondingly connected to a row of the plurality of second electrodes; and
  a plurality of second induction lines, wherein each of the plurality of second induction lines is correspondingly connected to a second electrode of the plurality of second electrodes, or each of the plurality of second scan lines is correspondingly connected to a column of the plurality of second electrodes.

In an embodiment, the first recognition device includes a plurality of third electrodes;
  wherein the display screen further includes:
  a plurality of driving lines, wherein each of the plurality of driving lines is correspondingly connected to a corresponding third electrode of the plurality of third electrodes.

In an embodiment, the second recognition device further includes a plurality of fourth electrodes arranged in an array;
  wherein the display screen further includes:
  a plurality of driving induction lines, wherein each of the plurality of driving induction lines is correspondingly connected to a corresponding fourth electrode of the plurality of fourth electrodes.

The present disclosure provides a display device, including a display screen, wherein the display screen includes: a display panel, a touch control layer, a first driving chip, and a second driving chip;
  wherein the touch control layer is disposed on the display panel, and includes a first recognition area and a second recognition area, and the touch control layer further includes:
  a first recognition device disposed on the first recognition area, and configured to generate fingerprint data corresponding to the first recognition area; and
  a second recognition device disposed on the second recognition area, and configured to generate touch control data corresponding to the second recognition area;
  wherein the first driving chip is electrically connected to the first recognition device, and configured to receive and process the fingerprint data to make a fingerprint identification of the first recognition area, and the first driving chip is further electrically connected to the second driving chip and configured to send the fingerprint data to the second driving chip; and
  wherein the second driving chip is electrically connected to the second recognition device and configured to receive and process both the touch control data and the fingerprint data to perform a touch recognition on both the first recognition area and the second recognition area.

In an embodiment, the first recognition device and the second recognition device are disposed on a same layer or a different layer.

In an embodiment, the touch control layer further includes a first conductive line layer and a first insulation layer when the first recognition device and the second recognition device are disposed on the same layer;
  wherein the first insulation layer is disposed between the first conductive line layer and the first recognition device, and between the first conductive line layer and the second recognition device;
  wherein the first insulation layer includes a first through-hole with a conductive material inside;
  wherein the first conductive line layer includes:
  a first conductive line, wherein an end of the first conductive line is connected to the first recognition device by the first through-hole, and another end of the first conductive line is connected to the first driving chip; and
  a second conductive line, wherein an end of the second conductive line is connected to the second recognition device by the first through-hole, and another end of the second conductive line is connected to the second driving chip.

In an embodiment, the first recognition device and the second recognition device are disposed on the display panel, or the first conductive line layer is disposed on the display panel.

In an embodiment, the touch control layer further includes a second conductive line layer, a second insulation layer, and a third insulation layer when the first recognition device and the second recognition device are disposed on the different layer;
  wherein the second recognition device is disposed on the display panel;
  wherein the second insulation layer is disposed on the second recognition device, and includes a second through-hole with a conductive material inside;
  wherein the second conductive line layer includes:
  a third conductive line, wherein an end of the third conductive line is connected to the second recognition device by the second through-hole, and another end of the third conductive line is connected to the second driving chip;
  a fourth conductive line, wherein an end of the fourth conductive line is connected to the first driving chip;
  wherein the third insulation layer is disposed on the second conductive line layer, and includes a third through-hole with a conductive material inside;
  wherein the second recognition device is disposed on the third insulation layer, and connected to another end of the fourth conductive line by the third through-hole.

In an embodiment, both the first recognition device and the second recognition device are mutual capacitance recognition devices or self-capacitance recognition devices.

In an embodiment, the first recognition device includes a plurality of first electrodes arranged in an array;
  wherein the display screen further includes:
  a plurality of first scan lines, wherein each of the plurality of first scan lines is correspondingly connected to a first electrode of the plurality of first electrodes, or a row of the plurality of first electrodes; and
  a plurality of first induction lines, wherein each of the plurality of first induction lines is correspondingly connected to a first electrode of the plurality of first electrodes, or a column of the plurality of first electrodes.

In an embodiment, the second recognition device includes a plurality of second electrodes arranged in an array;
  wherein the display screen further includes:
  a plurality of second scan lines, wherein each of the plurality of second scan lines is correspondingly connected to a second electrode of the plurality of second electrodes, or each of the plurality of second scan lines is correspondingly connected to a row of the plurality of second electrodes; and
  a plurality of second induction lines, wherein each of the plurality of second induction lines is correspondingly connected to a second electrode of the plurality of second electrodes, or each of the plurality of second scan lines is correspondingly connected to a column of the plurality of second electrodes.

In an embodiment, the first recognition device includes a plurality of third electrodes;
  wherein the display screen further includes:
  a plurality of driving lines, wherein each of the plurality of driving lines is correspondingly connected to a corresponding third electrode of the plurality of third electrodes.

In an embodiment, the second recognition device further includes a plurality of fourth electrodes arranged in an array;

wherein the display screen further includes:

a plurality of driving induction lines, wherein each of the plurality of driving induction lines is correspondingly connected to a corresponding fourth electrode of the plurality of fourth electrodes.

The fingerprint data generated by the first recognition device of the display screen and the display device according to an embodiment of the present disclosure can be configured to not only make a fingerprint identification, but also make a touch control recognition, increasing a utilization of the first recognition device.

In an embodiment of the present disclosure, by disposing a plurality of meshes on the ink layer on a lower surface of the glass cover, ultraviolet light can be better transmitted and irradiated on the adhesive layer, thereby making the adhesive layer be better cured and preventing a problem of poor curing of traditional adhesive.

BRIEF DESCRIPTION OF DRAWINGS

Technical solutions and other beneficial effects of the present disclosure will be obvious by describing the specific implementation of the present disclosure in detail with reference to the accompanying drawings.

DETAILED DESCRIPTION OF PREFERRED EMBODIMENTS

Figure 1:
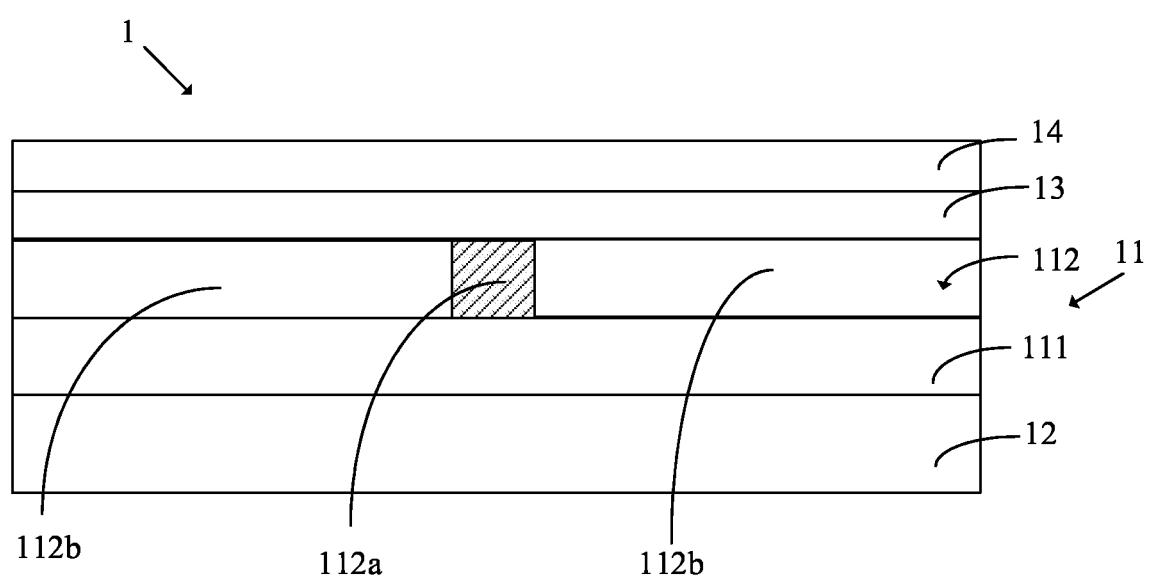
FIG. 1 is a first structural schematic diagram of a display device according to an embodiment of the present disclosure.

Embodiments of the present disclosure are described in detail with the technical matters, structural features, achieved objects, and effects with reference to the accompanying drawings as follows. It is clear that the described embodiments are part of embodiments of the present disclosure, but not all embodiments. Based on the embodiments of the present disclosure, all other embodiments to those of ordinary skill in the premise of no creative efforts obtained, should be considered within the scope of protection of the present disclosure.

In the description of the present disclosure, it should be understood that orientations or position relationships indicated by the terms "center", "longitudinal", "lateral", "length", "width", "thickness", "upper", "lower", "front", "rear", "left", "right", "vertical", "horizontal", "top", "bottom", "inside", "outside", "clockwise", and "counter-clockwise" are based on orientations or position relationships illustrated in the drawings. The terms are used to facilitate and simplify the description of the present disclosure, rather than indicate or imply that the devices or elements referred to herein are required to have specific orientations or be constructed or operate in the specific orientations. Accordingly, the terms should not be construed as limiting the present disclosure. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

In the description of the present disclosure, it should be noted that unless otherwise clearly defined and limited, the terms "mounted", "connected/coupled", and "connection" should be interpreted broadly. For example, the terms may refer to a fixed connection, a detachable connection, or an integral connection; the terms may also refer to a mechanical connection, an electrical connection, or communication with each other; the terms may further refer to a direct connection, an indirect connection through an intermediary, or an interconnection between two elements or interactive relationship between two elements. Those skilled in the art can understand the specific meanings of the above-mentioned terms in the present disclosure according to circumstances.

In the present disclosure, it should be noted that unless otherwise clearly defined and limited, a first feature "on" or "under" a second feature may mean that the first feature directly contacts the second feature, or that the first feature contacts the second feature via an additional feature there between instead of directly contacting the second feature. Moreover, the first feature "on", "above", and "over" the second feature may mean that the first feature is right over or obliquely upward over the second feature or mean that the first feature has a horizontal height higher than that of the second feature. The first feature "under", "below", and "beneath" the second feature may mean that the first feature is right beneath or obliquely downward beneath the second feature or mean that that horizontal height of the first feature is lower than that of the second feature.

The following description provides various embodiments or examples for implementing various structures of the present disclosure. To simplify the description of the present disclosure, parts and settings of specific examples are described as follows. Certainly; they are only illustrative, and are not intended to limit the present disclosure. Further, reference numerals and reference letters may be repeated in different examples. This repetition is for purposes of simplicity and clarity and does not indicate a relationship of the various embodiments and/or the settings. Furthermore, the present disclosure provides specific examples of various processes and materials, however, applications of other processes and/or other materials may be appreciated those skilled in the art.

An embodiment of the present disclosure provides a display device. Please refer to FIG. 1, FIG. 1 is a structural schematic diagram of the display device according to an embodiment of the present disclosure. As shown in FIG. 1, a display device includes a display screen 11, a back plate 12, a polarizer 13, and a cover plate 14. Wherein the back plate 12 and the display screen 11 can be attached by glue. The back plate 12 can be configured to support elements of the display screen 11.

Figure 6:
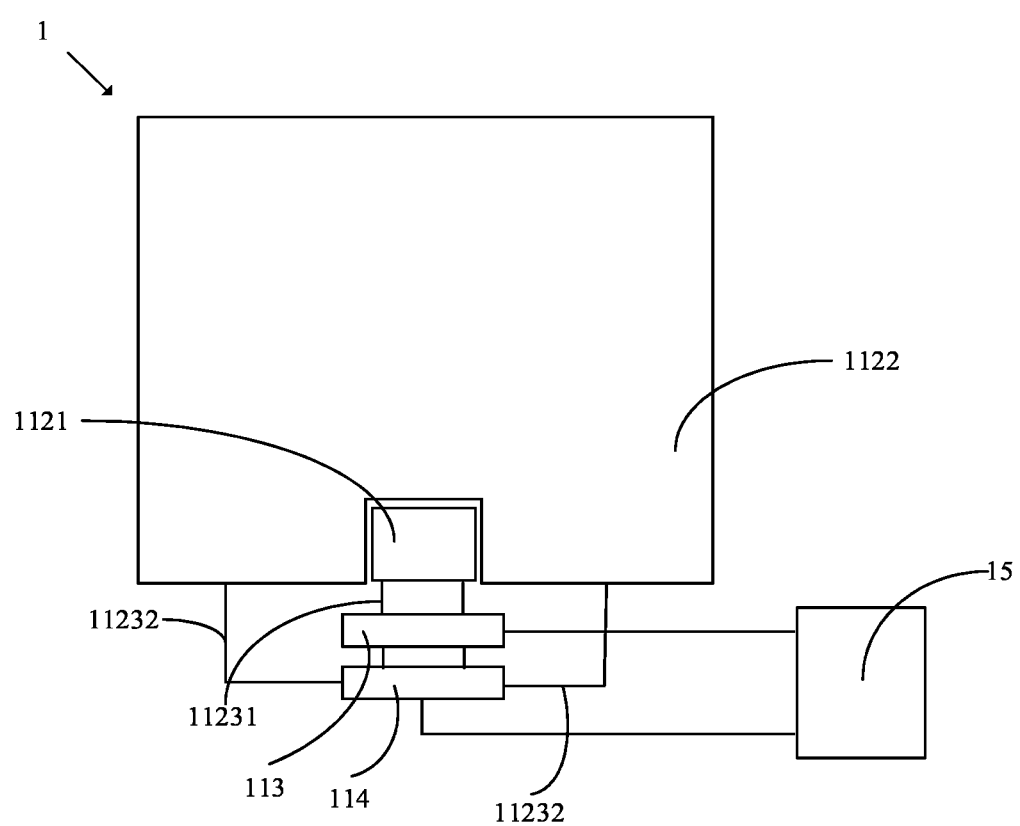
FIG. 6 is a fifth structural schematic diagram of the display device according to an embodiment of the present disclosure.

As shown in FIG. 1 and FIG. 6, the display screen 11 includes a display panel 111, a touch control layer 112, a first driving chip 113, and a second driving chip 114. Wherein the display panel 111 can be a liquid crystal display panel, or an organic light-emitting diode display panel, and it is not specifically limited herein.

The touch control layer 112 is disposed on the display panel 111. The touch control layer 112 includes a first recognition area 112*a* and a second recognition area 112*b*. Wherein the second recognition area 112*b* can include or not include the first recognition area 112*a*.

The touch control layer 112 further includes a first recognition device 1121 disposed on the first recognition area 112*a*. The first recognition device can be a mutual capacitance recognition device or a self-capacitance recognition device. Specifically, a transparent conductive material can be adopted in a surface of a substrate to make horizontal and vertical electrode arrays when the first recognition device 1121 is the self-capacitance recognition device. These horizontal electrodes and horizontal electrodes respectively form a capacitance with a ground, that is a self-capacitance. Specifically, the transparent conductive material can be adopted in the surface of the substrate to make the horizontal and vertical electrode arrays when the first recognition device 1121 is the mutual capacitance recognition device. The capacitance can be formed where two sets of electrodes intersect, that is, the two sets of electrodes respectively constitute two poles of the capacitor. The first recognition device 1121 can detect a change in capacitance of the first recognition area 112*a* to generate fingerprint data, when a finger presses the first recognition area 112*a*.

Figure 2:
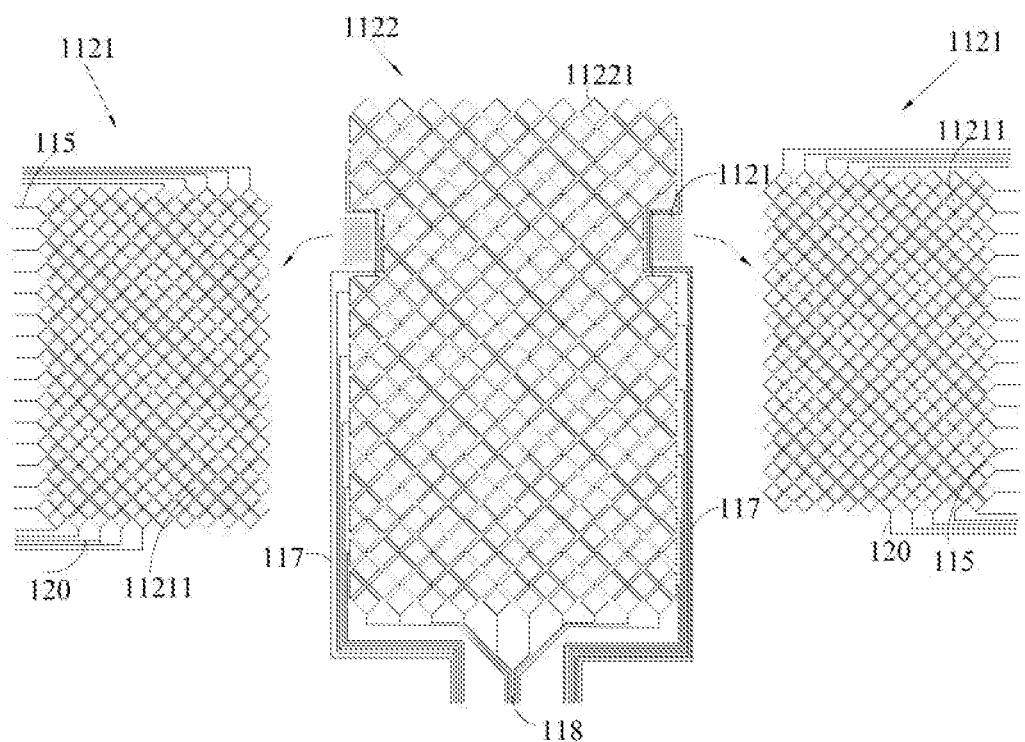
FIG. 2 is a second structural schematic diagram of the display device according to an embodiment of the present disclosure.

In an embodiment, as shown in FIG. 2, the first recognition device 1121 includes a plurality of first electrodes 11211 arranged in an array. The display screen 11 further includes a plurality of first scan lines 120 and a plurality of first induction lines 115. Wherein each of the first scan lines 120 is correspondingly connected to a first electrode 11211 or a row of the first electrodes 11211. Each of the plurality of first induction lines 115 is connected to a first electrode 11211 or a column of the first electrodes 11211.

Figure 3:
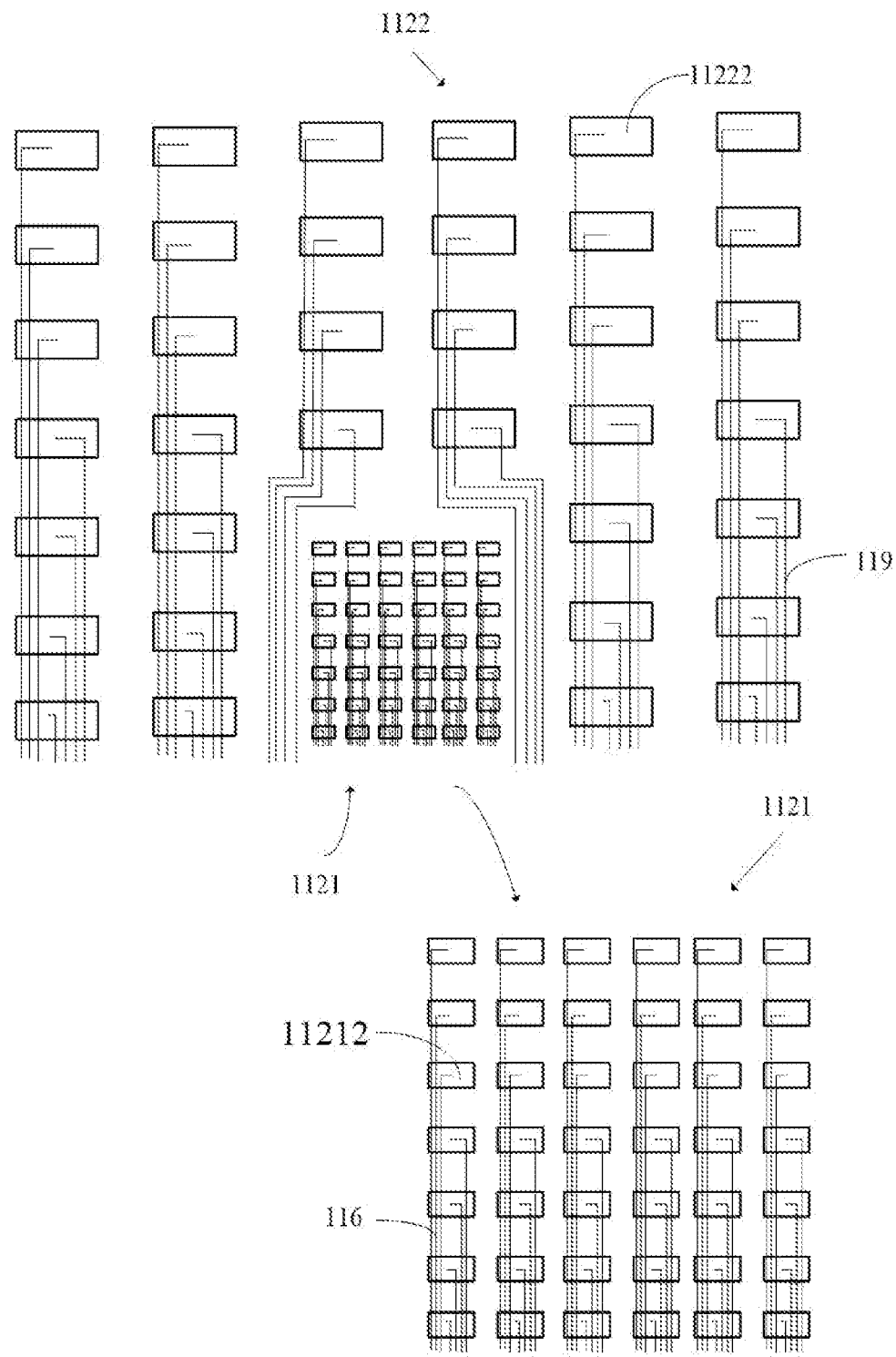
FIG. 3 is a structural schematic diagram of a touch control layer according to an embodiment of the present disclosure.

In an embodiment, as shown in FIG. 3, the first recognition device 1121 includes a plurality of third electrodes 11212. The display screen 11 further includes a plurality of driving lines 116. Wherein each of the driving lines 116 is correspondingly connected to a corresponding third electrode 11212.

The touch control layer 112 further includes a second recognition device 1122. Specifically, the transparent conductive material can be adopted in the surface of the substrate to make the horizontal and vertical electrode arrays when the second recognition device 1122 is the self-capacitance recognition device. These horizontal electrodes and horizontal electrodes respectively form the capacitance with the ground, that is the self-capacitance. Wherein the transparent conductive material can be indium tin oxide (ITO). Specifically, the transparent conductive material can be adopted in the surface of the substrate to make the horizontal and vertical electrode arrays when the second recognition device 1122 is the mutual capacitance recognition device. The capacitance can be formed where two sets of electrodes intersect, that is, the two sets of electrodes respectively constitute two poles of the capacitor. The second recognition device 1122 is disposed on the second recognition area 112*b*. The second recognition device 1122 is configured to make a touch control recognition for the second recognition area 112*b* to generate touch control data. The second recognition device 1122 can detect a change in capacitance of the second recognition area 112*b* to generate fingerprint data, when a finger presses the second recognition area 112*b*.

In an embodiment, as shown in FIG. 2, the second recognition device 1122 includes a plurality of second electrodes 11221 arranged in an array. The display screen 11 further includes a plurality of second scan lines 117 and a plurality of second induction lines 118. Wherein each of the second scan lines 117 is correspondingly connected to a second electrode 11221 or a row of the second electrodes 11221. Each of the plurality of second induction lines 118 is connected to a second electrode 11221 or a column of the second electrodes 11221.

In an embodiment, as shown in FIG. 3, the second recognition device 1122 further includes a plurality of fourth electrodes 11222 arranged in an array. The display screen 11 further includes a plurality of driving induction lines 119, wherein each of the driving induction lines 119 is correspondingly connected to a corresponding fourth electrode 11222.

Wherein, the first recognition device 1121 and the second recognition device 1122 can be disposed on a same layer or a different layer.

Figure 4:
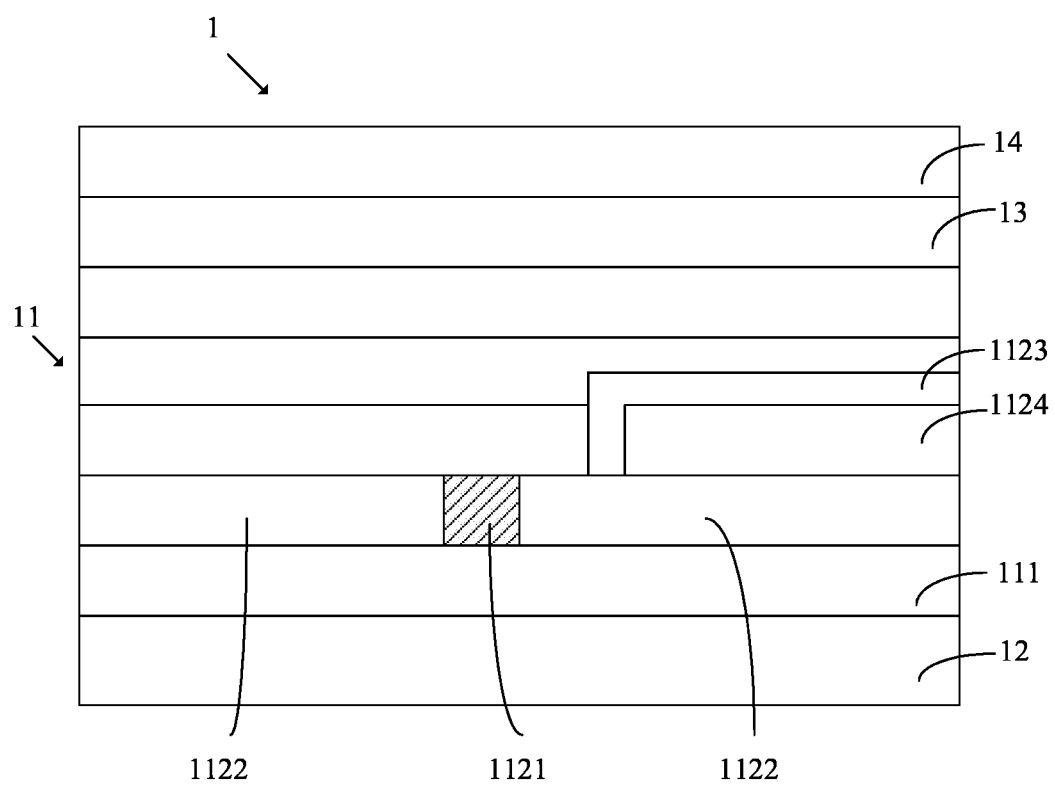
FIG. 4 is a third structural schematic diagram of the display device according to an embodiment of the present disclosure.
Figure 5:
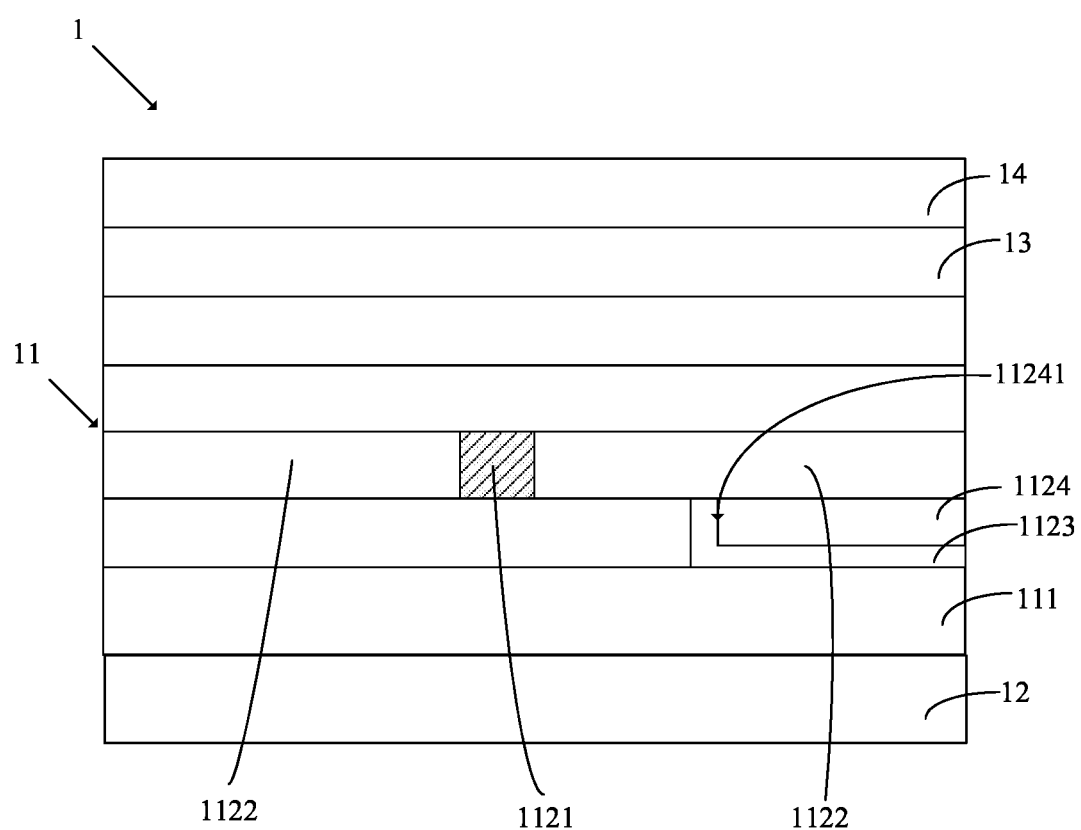
FIG. 5 is a fourth structural schematic diagram of the display device according to an embodiment of the present disclosure.

As shown in FIG. 4 or FIG. 5, the touch control layer 112 further includes a first conductive line layer 1123 and a first insulation layer 1124 when the first recognition device 1121 and the second recognition device 1122 are disposed on the same layer. Wherein the first insulation layer 1124 is disposed between the first conductive line layer 1123 and the first recognition device 1121, and between the first conductive line layer 1123 and the second recognition device 1122.

The first insulation layer 1124 includes a first through-hole 11241 with a conductive material inside. As shown in FIG. 6, the first conductive line layer 1123 includes a first conductive line 11231 and a second conductive line 11232. An end of the first conductive line 11231 is connected to the first recognition device 1121 by the first through-hole 11241, and another end of the first conductive line 11231 is connected to the first driving chip 113. An end of the second conductive line 11232 is connected to the second recognition device 1122 by the first through-hole 11241, and another end of the second conductive line 11232 is connected to the second driving chip 114.

In an embodiment, the first recognition device 1121 and the second recognition device 1122 are disposed on the display panel 111, or the first conductive line layer 1123 is disposed on the display panel 111.

Figure 7:
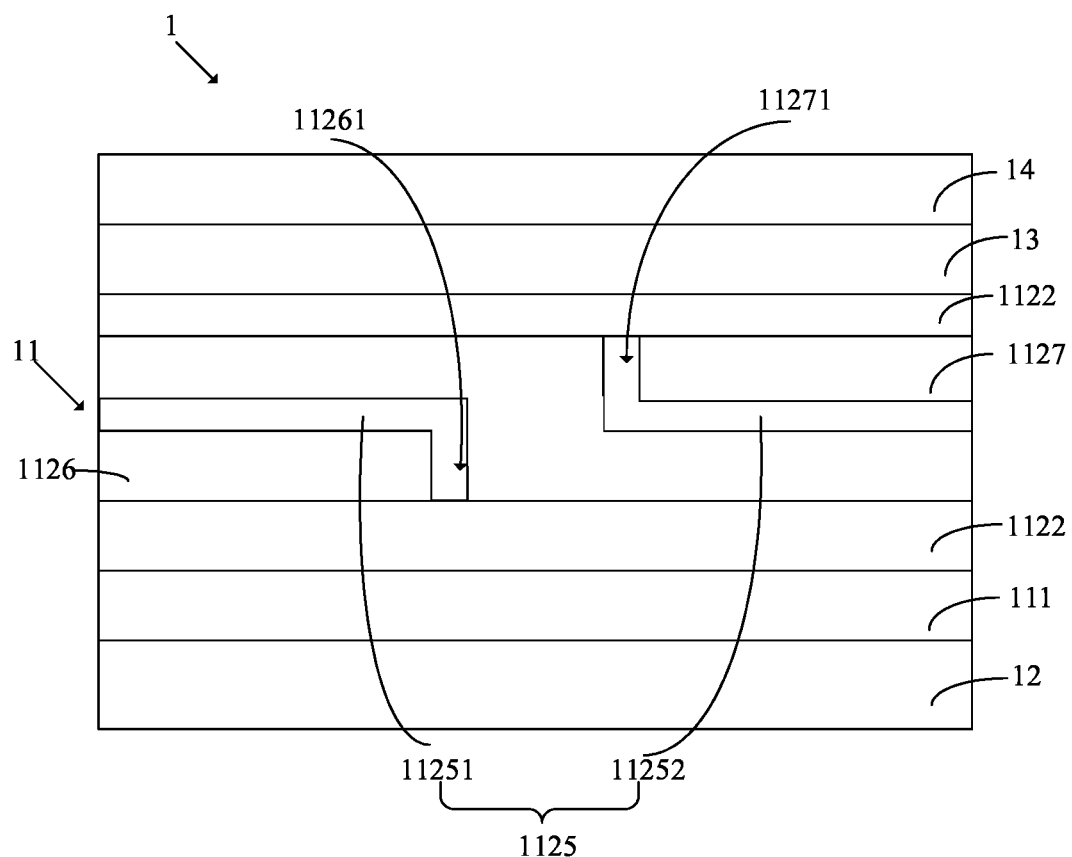
FIG. 7 is a sixth structural schematic diagram of the display device according to an embodiment of the present disclosure.

As shown in FIG. 7, the touch control layer 112 further includes a second conductive line layer 1125, a second insulation layer 1126, and a third insulation layer 1127 when the first recognition device 1121 and the second recognition device 1122 are disposed on the different layer. The second recognition device 1122 is disposed on the display panel 111. The second insulation layer 1126 is disposed on the second recognition device 1122, and includes a second through-hole 11261 with a conductive material inside. The second conductive line layer 1125 includes: a third conductive line 11251 and a fourth conductive line 11252. An end of the third conductive line 11251 is connected to the second recognition device 1122 by the second through-hole 11261, and another end of the third conductive line 11251 is connected to the second driving chip 114. An end of the fourth conductive line 11252 is connected to the first driving chip 113. The third insulation layer 1127 is disposed on the second conductive line layer 1125, and includes a third through-hole 11271 with a conductive material inside. The second recognition device 1122 is disposed on the third insulation layer 1127, and connected to another end of the fourth conductive line 11252 by the third through-hole 11271.

The first driving chip 113 is electrically connected to the first recognition device 1121, and configured to receive and process the fingerprint data. The first driving chip 113 is further electrically connected to the second driving chip 114, and configured to send the fingerprint data to the second driving chip 114.

The second driving chip 114 is electrically connected to the second recognition device 1122, and configured to receive and process both the touch control data and the fingerprint data to perform a touch recognition on both the first recognition area 112a and the second recognition area 112b.

In an embodiment, the display device 1 further includes a processor 15. The processor 15 adopts various interfaces and conductive lines to connect various parts of an entire display device, and executes various functions and processing data of the display device by running or executing software programs and/or modules, and calling data stored in the first driving chip 113 and the second driving chip 114.

The fingerprint data generated by the first recognition device of the display screen and the display device according to an embodiment of the present disclosure can be configured to not only make a fingerprint identification, but also make a touch control recognition, increasing a utilization of the first recognition device.

In the foregoing embodiments, the description of each embodiment has its own emphasis. For the parts that are not described in detail in one embodiment, reference may be made to related descriptions in other embodiments.

The display screen and the display device provided by the embodiments of the present disclosure are described in detail. The principles and implementations of the present disclosure are described in combination with specific embodiments. The above description of the embodiments is merely for the purpose of understanding the disclosure. In the meantime, for those skilled in the art, there will be changes in the specific implementation and application scope according to the idea of the present disclosure. In conclusion, the content of the specification of the present disclosure should not be construed as limitations of the scope of the present disclosure.

What is claimed is:

1. A display screen, comprising: a display panel, a touch control layer, a first driving chip, and a second driving chip;
    wherein the touch control layer is disposed on the display panel, and comprises a first recognition area and a second recognition area, and the touch control layer further comprises:
    a first recognition device disposed on the first recognition area, and configured to generate fingerprint data corresponding to the first recognition area; and
    a second recognition device disposed on the second recognition area, and configured to generate touch control data corresponding to the second recognition area;
    wherein the first driving chip is electrically connected to the first recognition device and configured to receive and process the fingerprint data to make a fingerprint identification of the first recognition area, and the first driving chip is further electrically connected to the second driving chip and configured to send the fingerprint data to the second driving chip;
    wherein the second driving chip is electrically connected to the second recognition device and configured to receive and process both the touch control data and the fingerprint data to perform a touch recognition on both the first recognition area and the second recognition area;
    wherein the first recognition device and the second recognition device are disposed on a same layer or a different layer from each other;
    wherein the touch control layer further comprises a first conductive line layer and a first insulation layer when the first recognition device and the second recognition device are disposed on the same layer;
    wherein the first insulation layer is disposed between the first conductive line layer and the first recognition device, and between the first conductive line layer and the second recognition device;
    wherein the first insulation layer comprises a first through-hole with a conductive material inside; and
    wherein the first conductive line layer comprises:
        a first conductive line, wherein an end of the first conductive line is connected to the first recognition device by the first through-hole, and another end of the first conductive line is connected to the first driving chip; and
        a second conductive line, wherein an end of the second conductive line is connected to the second recognition device by the first through-hole, and another end of the second conductive line is connected to the second driving chip.

2. The display screen as claimed in claim 1, wherein the first recognition device and the second recognition device are disposed on the display panel, or the first conductive line layer is disposed on the display panel.

3. The display screen as claimed in claim 1, wherein the touch control layer further comprises a second conductive line layer, a second insulation layer, and a third insulation layer when the first recognition device and the second recognition device are disposed on the different layer;
    wherein the second recognition device is disposed on the display panel;
    wherein the second insulation layer is disposed on the second recognition device, and comprises a second through-hole with a conductive material inside;
    wherein the second conductive line layer comprises:
        a third conductive line, wherein an end of the third conductive line is connected to the second recognition device by the second through-hole, and another end of the third conductive line is connected to the second driving chip;
        a fourth conductive line, wherein an end of the fourth conductive line is connected to the first driving chip;
    wherein the third insulation layer is disposed on the second conductive line layer, and includes a third through-hole with a conductive material inside; and
    wherein the second recognition device is disposed on the third insulation layer, and connected to another end of the fourth conductive line by the third through-hole.

4. The display screen as claimed in claim 1, wherein both the first recognition device and the second recognition device are mutual capacitance recognition devices or self-capacitance recognition devices.

5. The display screen as claimed in claim 1,
    wherein the first recognition device comprises a plurality of first electrodes arranged in an array;
    wherein the display screen further comprises:
        a plurality of first scan lines, wherein each of the plurality of first scan lines is correspondingly connected to a first electrode of the plurality of first electrodes, or a row of the plurality of first electrodes; and a plurality of first induction lines, wherein each of the plurality of first induction lines is correspondingly connected to a first electrode of the plurality of first electrodes, or a column of the plurality of first electrodes.

6. The display screen as claimed in claim 1,
wherein the second recognition device comprises a plurality of second electrodes arranged in an array;
wherein the display screen further comprises:
a plurality of second scan lines, wherein each of the plurality of second scan lines is correspondingly connected to a second electrode of the plurality of second electrodes, or each of the plurality of second scan lines is correspondingly connected to a row of the plurality of second electrodes; and
a plurality of second induction lines, wherein each of the plurality of second induction lines is correspondingly connected to a second electrode of the plurality of second electrodes, or each of the plurality of second scan lines is correspondingly connected to a column of the plurality of second electrodes.

7. The display screen as claimed in claim 1,
wherein the first recognition device comprises a plurality of third electrodes;
wherein the display screen further comprises:
a plurality of driving lines, wherein each of the plurality of driving lines is correspondingly connected to a corresponding third electrode of the plurality of third electrodes.

8. The display screen as claimed in claim 1,
wherein the second recognition device further comprises a plurality of fourth electrodes arranged in an array;
wherein the display screen further comprises:
a plurality of driving induction lines, wherein each of the plurality of driving induction lines is correspondingly connected to a corresponding fourth electrode of the plurality of fourth electrodes.

9. A display device, comprising a display screen, wherein the display screen comprises: a display panel, a touch control layer, a first driving chip, and a second driving chip;
wherein the touch control layer is disposed on the display panel, and comprises a first recognition area and a second recognition area, and the touch control layer further comprises:
a first recognition device disposed on the first recognition area, and configured to generate fingerprint data corresponding to the first recognition area; and
a second recognition device disposed on the second recognition area, and configured to generate touch control data corresponding to the second recognition area;
wherein the first driving chip is electrically connected to the first recognition device and configured to receive and process the fingerprint data to make a fingerprint identification of the first recognition area, and the first driving chip is further electrically connected to the second driving chip and configured to send the fingerprint data to the second driving chip;
wherein the second driving chip is electrically connected to the second recognition device and configured to receive and process both the touch control data and the fingerprint data to perform a touch recognition on both the first recognition area and the second recognition areal;

wherein the first recognition device and the second recognition device are disposed on a same layer or a different layer from each other;
wherein the touch control layer further comprises a first conductive line layer and a first insulation layer when the first recognition device and the second recognition device are disposed on the same layer;
wherein the first insulation layer is disposed between the first conductive line layer and the first recognition device, and between the first conductive line layer and the second recognition device;
wherein the first insulation layer comprises a first through-hole with a conductive material inside;
wherein the first conductive line layer comprises:
a first conductive line, wherein an end of the first conductive line is connected to the first recognition device by the first through-hole, and another end of the first conductive line is connected to the first driving chip; and
a second conductive line, wherein an end of the second conductive line is connected to the second recognition device by the first through-hole, and another end of the second conductive line is connected to the second driving chip.

10. The display device as claimed in claim 9, wherein the first recognition device and the second recognition device are disposed on the display panel, or the first conductive line layer is disposed on the display panel.

11. The display device as claimed in claim 9, wherein the touch control layer further comprises a second conductive line layer, a second insulation layer, and a third insulation layer when the first recognition device and the second recognition device are disposed on the different layer;
wherein the second recognition device is disposed on the display panel;
wherein the second insulation layer is disposed on the second recognition device, and comprises a second through-hole with a conductive material inside;
wherein the second conductive line layer comprises:
a third conductive line, wherein an end of the third conductive line is connected to the second recognition device by the second through-hole, and another end of the third conductive line is connected to the second driving chip;
a fourth conductive line, wherein an end of the fourth conductive line is connected to the first driving chip;
wherein the third insulation layer is disposed on the second conductive line layer, and includes a third through-hole with a conductive material inside;
wherein the second recognition device is disposed on the third insulation layer, and connected to another end of the fourth conductive line by the third through-hole.

12. The display device as claimed in claim 9, wherein both the first recognition device and the second recognition device are mutual capacitance recognition devices or self-capacitance recognition devices.

13. The display device as claimed in claim 9,
wherein the first recognition device comprises a plurality of first electrodes arranged in an array;
wherein the display screen further comprises:
a plurality of first scan lines, wherein each of the plurality of first scan lines is correspondingly connected to a first electrode of the plurality of first electrodes, or a row of the plurality of first electrodes; and
a plurality of first induction lines, wherein each of the plurality of first induction lines is correspondingly connected to a first electrode of the plurality of first electrodes, or a column of the plurality of first electrodes.

14. The display device as claimed in claim 9,
wherein the second recognition device comprises a plurality of second electrodes arranged in an array;
wherein the display screen further comprises:
- a plurality of second scan lines, wherein each of the plurality of second scan lines is correspondingly connected to a second electrode of the plurality of second electrodes, or each of the plurality of second scan lines is correspondingly connected to a row of the plurality of second electrodes; and
- a plurality of second induction lines, wherein each of the plurality of second induction lines is correspondingly connected to a second electrode of the plurality of second electrodes, or each of the plurality of second scan lines is correspondingly connected to a column of the plurality of second electrodes.

15. The display device as claimed in claim 9,
wherein the first recognition device comprises a plurality of third electrodes;
wherein the display screen further comprises:
a plurality of driving lines, wherein each of the plurality of driving lines is correspondingly connected to a corresponding third electrode of the plurality of third electrodes.

16. The display device as claimed in claim 9,
wherein the second recognition device further comprises a plurality of fourth electrodes arranged in an array;
wherein the display screen further comprises:
a plurality of driving induction lines, wherein each of the plurality of driving induction lines is correspondingly connected to a corresponding fourth electrode of the plurality of fourth electrodes.

* * * * *